United States Patent [19]
Arvisenet

[11] 4,067,239
[45] Jan. 10, 1978

[54] ADDING FLOWMETER

[76] Inventor: Jacques Arvisenet, 17, rue Guibert, 78 La Celle St. Cloud, France

[21] Appl. No.: 710,463

[22] Filed: Aug. 2, 1976

[51] Int. Cl.² ............................................. G01F 3/20
[52] U.S. Cl. .......................................... 73/270; 73/271
[58] Field of Search .......................... 73/271, 270, 269

[56] References Cited

U.S. PATENT DOCUMENTS

| 398,721 | 2/1889 | Harrell | 73/270 |
| 468,008 | 2/1892 | Knickerbocker | 73/270 |
| 488,504 | 12/1892 | Knickerbocker | 73/270 |

FOREIGN PATENT DOCUMENTS 2,502,870  6/1962  Japan ..................................... 73/269

*Primary Examiner*—Anthony V. Ciarlante

*Attorney, Agent, or Firm*—Mason, Kolehmainen, Rathburn & Wyss

[57] ABSTRACT

An adding flowmeter comprises a liquid chamber and is divided into two chamber parts by a membrane fixed to a slide which is able to move along a rod. The rod controls a slide valve for the supply and discharge of liquid to and from each of the chamber parts. By means of two abutments against which the slide bears on the rod, the membrane is able to move this rod in order to reverse the supply and discharge connections of the flowmeter so that the membrane carries out a reciprocating movement, filling one of the half-chambers and emptying the other, then vice versa. The number of changes of state of the slide valve are counted to determine the volume of liquid which has circulated in the flowmeter.

5 Claims, 1 Drawing Figure

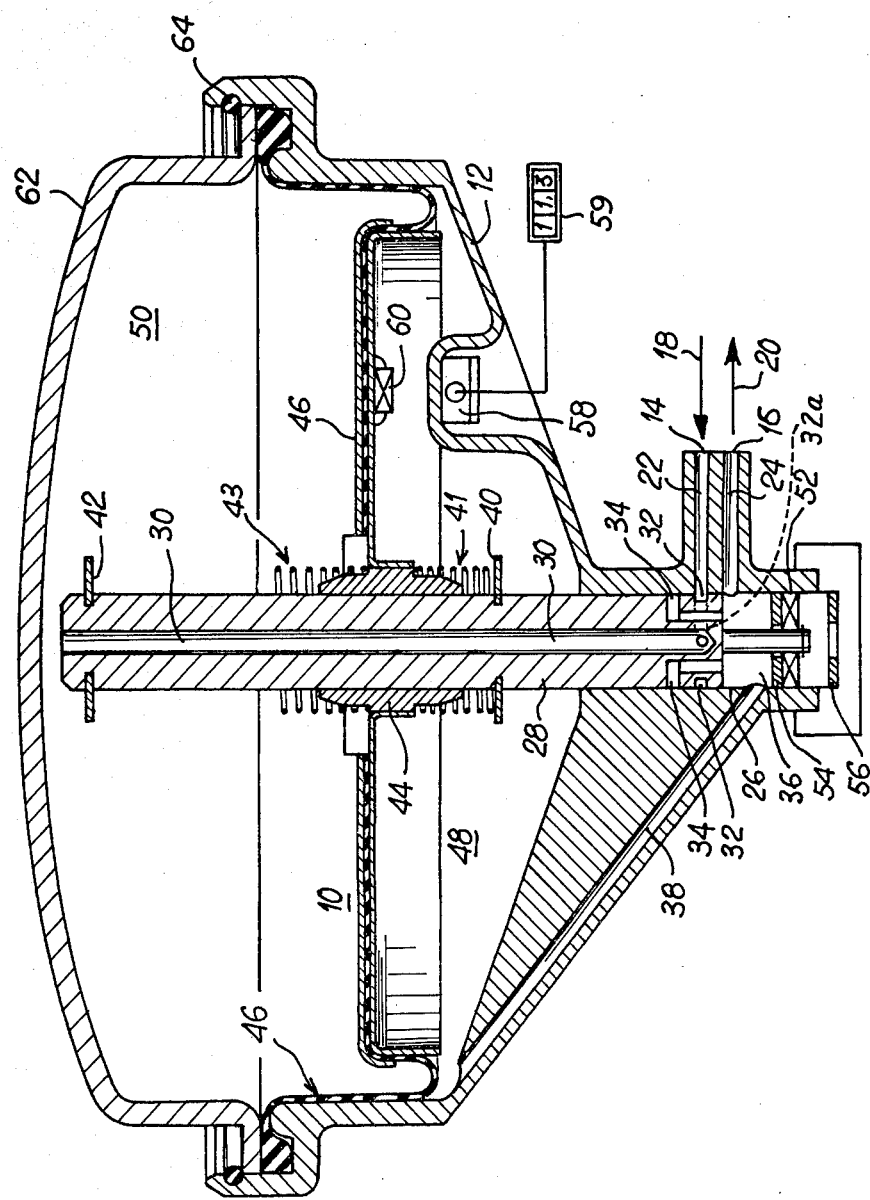

ADDING FLOWMETER

The invention relates to an adding flowmeter capable of providing an indication of the volume of liquid circulating over a given period of time in a liquid circuit.

More particularly, the adding flowmeter according to the invention may be used as an indicator of the consumption of liquid fuel in an engine, in particular of a vehicle.

Flowmeters of the prior art have two types of drawbacks: certain of the latter do not directly provide a totalling indication and it is necessary to integrate the magnitude which they provide in order to obtain a total volume of the flow. Others are too complex to be easily adapted to present needs, such as measuring the rate of flow of fuel in a touring vehicle.

The present invention proposes a flowmeter of simple construction and whose operating principle ensures that a total volume of the liquid flowing through is obtained directly without any integration of the rate of flow per unit time being necessary.

According to the invention, the adding flowmeter comprises a chamber able to be filled with liquid, of which it is desired to measure the quantity flowing through and a wall dividing the chamber into two separate half-chambers, this wall being displaceable under the effect of a liquid pressure difference between the two half-chambers, whilst retaining a sufficient seal between the half-chambers.

The movable wall is able to act on a movable slide valve for supplying liquid to the half-chambers. This slide valve has two positions and in a first position it may connect a liquid supply pipe and outlet pipe respectively to the first and second half-chamber or even, in a second position, change the connections, i.e. connect the supply pipe to the second half-chamber and the outlet pipe to the first chamber.

When the slide valve is in its first position, the movable wall moves in one direction under the effect of a liquid pressure difference between the half-chambers, until it causes the tilting of the slide valve into its second position, which has the effect of reversing the direction of the liquid pressure difference. The movable wall thus moves in the other direction in order to bring about a further tilting of the slide valve and so on.

A counter counts the number of tilting movements of the slide valve to give an evaluation of the volume of liquid which has circulated between the pipe for supplying liquid to the flowmeter and the outlet pipe.

In order that the measurement of the rate of flow is as accurate as possible, it is necessary that the two positions of the moving wall which correspond to tilting of the slide valve, define a given liquid volume as precisely and repetitively as possible. This volume depends on the effective position of the wall when tilting takes place.

In a practical manner, the movable wall is constituted by a flexible liquid-tight membrane fixed firstly to the wall of the chamber and secondly to a slide movable along a rod passing through the chamber. This rod is provided with two abutments which limit the travel of the slide and is itself movable. If a liquid pressure is exerted on one side of the membrane, the latter moves until the slide strikes against one abutment of the rod. A force is thus transmitted longitudinally to the rod, which may thus move. The rod is connected to the supply slide valve such that its movement controls the slide valve.

In order that all the liquid reaching the flowmeter through the supply pipe and leaving through the outlet pipe effectively passes into one or other of the half-chambers, which is a condition necessary for a correct measurement of the rate of flow, it is necessary that the slide valve has only two well defined stable positions and no intermediate position in which there would be a danger of the liquid passing directly from the supply pipe to the outlet pipe, without penetrating the chamber. However, it should be noted that if any mechanical incident were to occur and jam said slide valve in an intermediate position, the measurement could no longer be ensured, but the connection between the supply and outlet pipes would not be interrupted and the circulation of the fluid would thus cotinue normally.

It is thus provided that the tilting of the slide valve from one position to the other is sudden and for this one introduces a minimum force threshold to be applied to the rod which controls the slide valve, in order that tilting occurs. Beyond this threshold the rod and slide valve move in an unstable manner until the slide valve is located in its other position.

To overcome this force threshold, one uses the attraction force of a magnet on a magnetic member: a force threshold has to be applied to separate the magnet from the member, beyond which the displacement may take place with a clearly lesser force stored in a resilient device, for example a spring device. A magnet is thus provided, supported by the rod and capable of coming into contact with a member made from magnetic material when the slide valve is in one position and with another member made from magnetic material when the slide valve is in the other position.

In practice, the rod and slide valve will be constituted by a single machined cylindrical member, the rod part penetrating the two half-chambers and the slide valve part being housed in a bore in the body of the flowmeter, this bore receiving a supply and outlet pipe for the liquid.

Further advantages and characteristics of the invention will become apparent from the following detailed description which is given with reference to the accompanying drawings, in which the single FIGURE is a sectional view of a preferred embodiment of the flowmeter according to the invention. This flowmeter will be described hereafter as being located in the circuit for supplying liquid fuel to the carburettor of an explosion engine, with a view to measuring the fuel consumption of this engine. Naturally, other uses may be provided for this flowmeter.

In the single FIGURE, a chamber able to contain liquid whose rate of flow it is desired to measure, is designated by the reference 10. This chamber 10 is formed in a body 12 of the flowmeter, hermetically sealed except as regards an opening 14 for the supply of liquid and a discharge opening 16.

All the liquid whose rate of flow it is desired to measure circulates between the supply opening 14 and the discharge opening 16. The flowmeter is arranged in series in the circuit to be checked, which is not shown. External means are provided for producing a pressure difference between the supply pipe and outlet pipe, in order to impose a direction of flow of the liquid (in a vehicle, a fuel supply pump is generally provided, which produces this circulation).

The direction of flow, therefore the direction of the pressure difference is illustrated by the arrows 18 and 20.

A supply pipe 22 and outlet pipe 24 respectively connect the openings 14 and 16 to a bore 26 provided in the body 12 of the cylinder. This bore contains a movable slide valve constituted by a machine cylinder 28, which is able to slide in a relatively tight manner in the bore 26. A central hole 30 is provided in the cylinder 28, which hole is connected to a circular groove 32 on the periphery of the cylinder 28 via a passage 32a.

Another peripheral circular groove 34, separated from the groove 32 is connected to a free space 36 below the cylinder 28.

The seal between the circular groove 32 and the groove 34 or free space 36 is ensured by fitting the machined cylinder 28 in the bore 26 of the flowmeter body. However, according to one advantageous embodiment, this seal may be improved by the interposition of a gasket comprising a lip.

A pipe 38 for connecting the chamber 10 to the movable slide valve for supplying liquid opens into the free space 36. The slide valve for supplying liquid to the chamber 10 is constituted by the lower part of the cylinder 28 (part contained in the bore 26 and comprisng circular grooves). It is extended in the chamber 10 by a control rod also constituted by the cylinder 28. It is clear that the control rod may be formed in another manner, for example by a cylinder having a different diameter, but for simplicity of manufacture of the machined parts, it is preferable that the supply slide valve and its control rod are constituted by a single machined cylinder.

The cylinder 28 extends virtually to the top of the chamber 10 (at least when the slide valve is in the upper position). The central hole 30 opens into the chamber 10 at the top of the cylinder.

The cylinder 28 is provided with two fixed abutments 40 and 42, which limit the travel of a slide 44, which may travel to and fro along the cylinder.

The inner diameter of the slide is adjusted such that its contact with the cylinder 28 is as tight as possible.

A liquid-tight flexible membrane 46 fixed on one side to the slide 44 and on the other to the periphery of the chamber 10, constitutes a movable wall for separating the chamber 10 to form two half-chambers (a lower half 48 and upper half 50), separated from each other apart from leakages in the moving parts. The membrane 46 may advantageously be constituted by a membrane sold under the trade name "BELLOFRAM" by the company "Le joint Francais" for example.

The pipe 38 opens out in the vicinity of the top of the lower half-chamber 48, whatever the position of the membrane 46. In the same way, the pipe 30 provided in the slide valve and its control rod (cylinder 28) opens out at the top of the upper half-chamber 50. It will be seen that this arrangement is essential for facilitating a good circulation of liquid in the half-chambers. It implies vertical use of the arrangement.

The supply slide valve is made such that in its upper position the circular groove 32 is in facing relationship with the liquid supply pipe 22 which opens out in the bore 26 and the free space 36 is connected to the discharge pipe 24.

In the upper position of the slide valve, it will be seen that the upper half-chamber receives liquid directly from the supply pipe 22, whereas the lower half-chamber is connected to the discharge pipe 24 by means of the free space 36. The pressure difference existing between these two pipes is exerted on the membrane 46 which, due to this, moves (downwards) thus entraining the slide 44 along the rod for controlling the slide valve, as far as the lower abutment 40. This abutment stops the slide, but the membrane continues to be subjected to a liquid pressure difference. Since any additional movement of the slide is prevented by the abutment, the membrane exerts a greater force on the control rod, by means of the abutment 40. When this force becomes sufficient, the cylinder arrangement 28 (control rod plus slide valve) is moved downwards and the slide valve passes into its other (lower) position.

In this lower position, the circular groove 34 (and no longer the groove 32) is opposite the supply pipe 22, such that the lower half-chamber 48 is connected to the supply pipe 22 by means of the free space 36. On the other hand, the groove 32 is in facing relationship to the discharge pipe 24 such that the upper half-chamber 50 is connected to the discharge pipe 24.

The connections of the supply slide valve to the half-chambers have thus been reversed. In the lower position, the membrane 46 is subject to a pressure difference in the opposite direction to the former and rises, thus entraining the slide 44 as far as the upper abutment 42, on which it exerts a force until it causes further tilting of the slide valve towards its upper position and so on.

The half-chambers 48 and 50 are permanently completely filled with liquid. In each position of the slide valve, one of the half-chambers receives liquid and thus increases in volume, whereas the other decreases in volume and discharges the liquid which it contains. In the other position, the situation is reversed.

Consequently, it is desirable firstly that the slide valve has only two well defined stable positions and no intermediate position and secondly that the passage from one position to the other takes place as suddenly and quickly as possible.

This is achieved by imposing a minimum force threshold which it is necessary to apply in order to shift the slide valve from one of its positions, the force necessary for carrying out the remainder of the travel being clearly less than this threshold, such that once the threshold is passed the slide valve passes abruptly into the other position. An identical threshold is provided for the other position.

These thresholds are achieved by means of a magnet 52 supported by the slide valve, this magnet being able to come into contact with a member 54 made from magnetic material in order to define the upper position of the slide valve, or with a member 56 made from magnetic material for defining the lower position. These members are fixed to the body of the flowmeter, inside the bore 26. The position of the members 54 and 56 is naturally regulated, taking into account the width of the magnet 52, in order that the circular grooves 32 and 34 come into the correct position opposite the supply and discharge pipes 22 and 24 in both positions of the slide valve.

The magnet 52 makes it possible to produce the desired force threshold. In fact, it is known that the attraction force between a magnet and a magnetic part is much stronger when there is an effective contact than when an air gap exists. Consequently, as soon as the detachment of the magnet is achieved, the cylinder arrangement supporting the magnet could move under the impetus of movement provided by the taut membrane 46, until it rapidly reaches the other position of contact of the magnet. Nevertheless, according to an advantageous embodiment of the present invention, the slide 44 is equipped with two springs 41 and 43 located respectively on the lower and upper parts of said slide. When they are in the compressed state, these springs 41 and 43 are respectively in contact with the abutments 40 and 42 and are able to provide a force which is less than the attraction force of the magnet on the magnetic member but which, beyond the force threshold created by the displacement of the membrane, makes it possible to move the cylinder 28 by translation until the magnet 52 is once more attracted into its preceding position of equilibrium by the member 56.

The movement of the membrane 46 is cyclic and tilting of the slide valve occurs each time the membrane reaches a predetermined position (at the top or bottom), depending on the position of the abutments on the rod and the value of the force threshold to be overcome to produce tilting. By way of example, the latter may be several Kilograms.

The volume of liquid which has circulated in the flowmeter between two successive tilting movements of the slide valve is equal to the volume comprised between the two extreme positions of the membrane 46. The abutments 40 and 42 are thus positioned or the force threshold is regulated by the choice of an appropriate magnet 52, such that this volume of liquid is a sub-multiple of one unit according to which it is desired to measure the rate of flow.

By way of example, this volume is 50 cm$^3$, such that two consecutive tilting movements in the same direction of the slide valve correspond to 100 cm$^3$ (1/10 of a liter). It is therefore only necessary to count the number of tilting movements in the same direction in order to obtain an addition in multiples of 100 cm$^3$ of the quantity of liquid which has circulated in the flowmeter.

Counting is carried out by means of a magnetically controlled contact 58, located on the body of the flowmeter (on the outside) and connected to a display counter 59. This contact produces pulses for actuating the counter each time it is itself triggered. The change of state of the contact is brought about by a magnet 60 supported by the slide 44 and it takes place when the slide causes the slide valve to tilt into the lower position. In fact, it is only at this moment that the magnet 60 is sufficiently close to the contact 58 to trigger it. The counter is electromechanical, counts in tens and may be re-set to zero.

Although the seal between the two half-chambers is necessary, for simplification of the construction and in order that the movements take place with light friction, it is not provided with sealing segments on the slide. The inner bore of the slide and cylinder 28 are machined precisely and the volume of leakages which may exist between the half-chambers is known for a given pressure difference between the half-chambers. The position of the abutments 40 and 42 may take into account this volume of leakages which means that the actual volume, forced back by the membrane between its two extreme positions, is less than the geometric volume which exists between these two positions.

The same is true of possible leakages in the bore 26 of the cylinder 28 (which does not have any sealing segments). A certain constant volume of leakages passes directly from the groove 34 into the groove 32 and this should be taken into account when standardising the volume delivered per cycle of the slide valve.

The top of the chamber 10 is preferably constituted by a cover 62 which, when it is fixed against the remainder of the body 12 of the flowmeter, traps the membrane over its entire periphery in order to retain it in a liquid-tight manner along the inner periphery of the chamber 12.

A securing bead 64, made from resilient material, bearing firstly on the cover 62 and secondly on the remainder of the body 12 of the flowmeter, presses these two members tightly one against the other to ensure closure of the chamber 10. The body 12 of the flowmeter is made from non-magnetic material (for example zamac) to facilitate the control of the contact 58 by the magnet 60.

It has been seen that the pipe 38 for connecting the supply slide valve to the half-chamber 48 and the central hole 30 for connecting the supply slide valve to the half-chamber 50 each open out in the vicinity of the top of its respective half-chamber. The purpose of this is to prevent air bubbles from forming in the two half-chambers or conduits, which would prevent a correct evaluation of the rate of flow, when the liquid is forced out of either of the half-chambers.

It has been assumed that the movable wall which divides the chamber 10 was a flexible membrane, but it could also be rigid. This could be a piston for example sliding in a cylindrical chamber 10. In all cases, the wall moves simply under the effect of a liquid pressure difference on either side and it acts on the slide valve which supplies each half-chamber. The construction of the slide valve in the actual body of the flowmeter is very advantageous since it reduces the cost of the apparatus appreciably with respect to the cost which would be incurred by a separate slide valve controlled mechanically or electrically and this is why it has been adopted in the preferred embodiment of the invention.

Naturally, other variations are possible without diverging from the framework of the invention, as defined in the accompanying claims.

What is claimed is:

1. An adding flowmeter adapted for arrangement in series in a liquid flowpath between a liquid supply pipe and a liquid outlet pipe and comprising:
    a liquid chamber enclosed in a casing having an inlet duct and an outlet duct which both open into a cylindrical bore provided in a portion of the casing, said liquid chamber being divided, in a liquid-tight manner, into first and second compartments by a movable dividing wall;
    a single slide-valve comprising an actuating rod arranged for slidable movement into the said bore between a first and second stable positions, said rod having internal ducts for connecting the inlet duct and the outlet duct respectively to the first compartment and the second compartment when the rod is in the first stable position, and respectively to the second and the first compartment when the rod is in its second stable position;
    a resilient mechanical connection between said dividing wall and said rod;
    first magnetic means at one end of the rod, cooperating with second magnetic means carried by the casing, arranged so as to establish a physical contact between said first and second magnetic means when the rod is in either one or the other of the two said stable positions, in order to create a threshold force to be overcome for enabling a movement of said actuating rod;
    counting means responding to the displacement of the dividing wall for counting back and forth movements of said wall.

2. An adding flowmeter as claimed in claim 1 wherein said wall is a rigid wall peripherally linked to the casing in a liquid-tight manner by a flexible membrane.

3. An adding flowmeter as claimed in claim 1 wherein said movable wall is connected to a slider which is movably mounted on said rod between two abutments provided on the rod, and wherein spring means are provided between said slider and said abutments.

4. An adding flowmeter as claimed in claim 1 wherein said rod comprises an internal duct extending to an opening provided in the rod in one of the compartments.

5. An adding flowmeter as claimed in claim 1 wherein said second magnetic means comprises a plurality of ferromagnetic pieces having facing parallel flat surfaces and said first magnetic means comprise a magnet placed between said flat surfaces, said magnet having a pair of parallel flat surfaces each capable of coming into contact with the said flat surfaces of a respective one of said ferromagnetic pieces.

* * * * *